March 27, 1928.

J. A. MARNELL

CLAMP

Filed Aug. 22, 1927

1,663,602

Inventor
Jos. A. Marnell

By Clarence A. O'Brien
Attorney

Patented Mar. 27, 1928.

1,663,602

UNITED STATES PATENT OFFICE.

JOSEPH ALBERT MARNELL, OF FLINT, MICHIGAN.

CLAMP.

Application filed August 22, 1927. Serial No. 214,639.

The present invention relates to an improved clamp such as is particularly adapted for use in a rim tool adapted to be used in connection with means for expanding and contracting tire rims to facilitate application and removal of a tire.

I am aware of the fact that it is broadly old in this art to provide a pair of complemental rim clamps constructed to grip a transversely split rim on opposite sides of the split, wherein a suitable turn buckle structure is employed for moving the clamps toward and from each other to facilitate expansion and contraction.

The present invention, however, relates to several improvements, the first of which is the particular construction of each of the rim clamps, these being composed of specially designed jaws moved toward each other by a bolt and nut connection, and moved away from each other through the medium of a coiled spring, the adjacent ends of the respective jaws being connected together by a separable pin joint.

An equally important feature of the invention is the turn buckle wherein the oppositely threaded shanks are provided on their outer ends with hooks for separable connection with the pin joints of said clamping jaws.

Other structural features and indispensable advantages will become more readily apparent from the following description and drawings:

In the accompanying drawings:—

Figure 1:
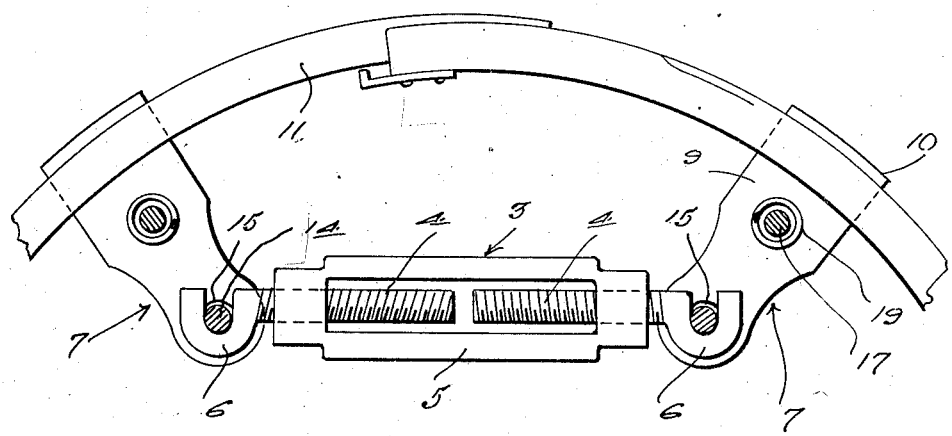
Figure 1 is a view of the improved tool showing the manner in which it is used.

Referring now to the drawings by reference numerals it will be observed that the reference character 3 designates generally the turn buckle which includes a pair of oppositely disposed screw threaded shank members 4 connected together by an appropriate hand-grip 5. As before indicated, these shanks are provided at their outer ends with hooks 6 which serve the purpose to be hereinafter described.

Figure 2:
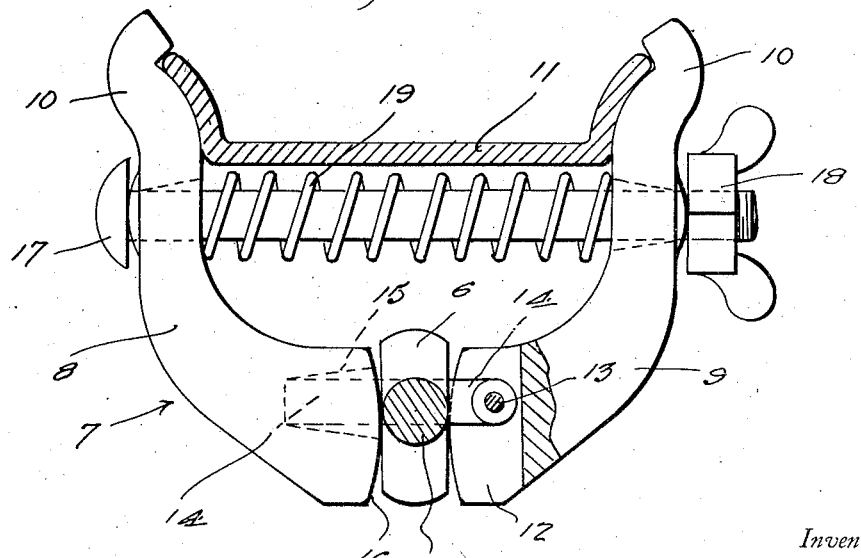
Figure 2 is an enlarged sectional and elevational view showing the jaw construction, the pivot pin connection between the jaws and the separable hooked connection of the turn buckle with the pin.

Referring particularly to Figure 2 it will be observed that the reference character 7 designates generally one of the improved rim clamps. Each clamp comprises a pair of jaws 8 and 9 respectively, these having their free end portions 10 shaped to conform to and effectively grip the side flanges of the tire rim 11. The right hand jaw 9 is bifurcated as indicated at 12 and a pivot pin 13 extends between and is connected with the furcations. A connecting or coupling pin 14 is provided with an eye at one end which is pivotally mounted on the pin 13. The free end portion of this coupling pin 14 is adapted for removable reception in a tapered socket 15 formed in the corresponding end portion of the complemental jaw 8. Incidentally, the opposed faces or end portions of the jaws are curved on the arc represented in Figure 2, and indicated at 16. This permits the desired rocking motion. The curved end portions of the respective jaws are spaced apart sufficiently to accommodate the hook 6 which is detachably engaged with the coupling pin 14.

The intermediate portions of the jaws are formed with enlarged holes through which a bolt 17 passes. The threaded end of this bolt carries a wing nut 18, and a coiled spring 19 surrounds the intermediate portion of the bolt and is located between and bears against the jaws 8 and 9. This spring is of the expansion type and serves to hold the jaws away from each other.

From the foregoing description and drawings it will be seen that I have evolved and produced a novel rim tool which is characterized by simplicity of construction, inexpensiveness of manufacture, and efficiency in operation. Particularly is the tool individualized by the exceptional compactness and convenience of arrangement of parts which permits them to be readily separated and packed in a comparatively small tool box. Not only this, the relative adjustment and movement of parts allows quick and easy application and when the clamps are applied to the rim ends as shown in Figure 1 it is obvious that the rim ends can be moved into overlapping relation to the desired degree to facilitate application and removal of the tire. Not only is the connection between the turn buckle and the coupling pins of the respective clamps a separable connection, but it is a pivotal connection and allows the clamps to be angled with respect to the axis of rotation of the shank members. Thus, a firm clamping grip is always assured. In fact with this arrangement the clamps can be first applied whereupon the turn buckle can be slipped into place and tightened for either expanding or contracting the rim according to requirements. These and other advantages and features of the invention have doubtless been made apparent from the foregoing description, for which reason a more lengthy explanation is believed unnecessary.

Minor changes in shape, size, and rearrangement of parts coming within the field of invention claimed may be resorted to if desired.

Having thus described the invention, what I claim as new is:—

As a new product of manufacture, a clamp comprising a pair of substantially duplicate jaws having their outer end portions shaped to engage the side flanges of a tire rim, the inner ends of said jaws being located in close proximity for connecting with each other, one of said ends being bifurcated, the other end being formed with a socket, a pin pivoted between the furcations having its free end removably received in said socket, the intermediate portion of said jaws being formed with bolt holes, a bolt extending through said holes and having the screw threaded end equipped with a thumb nut, and a coil spring surrounding the intermediate portion of said bolt and bearing at its opposite ends against said jaws.

In testimony whereof I affix my signature.

JOSEPH ALBERT MARNELL.